(12) United States Patent
Dufosse et al.

(10) Patent No.: US 9,614,885 B2
(45) Date of Patent: Apr. 4, 2017

(54) OPERATIONAL MANAGEMENT SOLUTION FOR MEDIA PRODUCTION AND DISTRIBUTION

(71) Applicant: GVBB HOLDINGS S.A.R.L., Luxembourg (LU)

(72) Inventors: Eric Denis Dufosse, Portland, OR (US); Nadine Patry, Rennes (FR); Wilfried Reiner, Hessen (DE)

(73) Assignee: GVBB HOLDING S.A.R.L., Luxembourg (LU)

( * ) Notice: Subject to any disclaimer, the term of this patent is extended or adjusted under 35 U.S.C. 154(b) by 311 days.

(21) Appl. No.: 13/950,161

(22) Filed: Jul. 24, 2013

(65) Prior Publication Data

US 2013/0311606 A1 Nov. 21, 2013

Related U.S. Application Data

(62) Division of application No. 12/450,565, filed as application No. PCT/US2008/004230 on Apr. 1, 2008, now Pat. No. 8,744,246.

(60) Provisional application No. 60/923,027, filed on Apr. 12, 2007.

(51) Int. Cl.
*H04N 5/76* (2006.01)
*H04L 29/06* (2006.01)
*H04N 9/804* (2006.01)
*G06Q 10/06* (2012.01)
*G06Q 10/10* (2012.01)

(52) U.S. Cl.
CPC ........... *H04L 65/601* (2013.01); *G06Q 10/06* (2013.01); *G06Q 10/06311* (2013.01); *G06Q 10/10* (2013.01); *H04N 9/8042* (2013.01)

(58) Field of Classification Search
CPC .................................................... H04N 9/8042
USPC ......................................................... 386/326
See application file for complete search history.

(56) References Cited

U.S. PATENT DOCUMENTS

| | | |
|---|---|---|
| 5,136,708 A | 8/1992 | Lapourtre et al. |
| 5,943,051 A | 8/1999 | Onda et al. |
| 6,418,361 B2 | 7/2002 | Sinex |
| 6,571,158 B2 | 5/2003 | Sinex |

(Continued)

FOREIGN PATENT DOCUMENTS

| | | |
|---|---|---|
| EP | 0294891 | 12/1988 |
| JP | 2001298699 A | 10/2001 |

(Continued)

OTHER PUBLICATIONS

First Office Action dated May 16, 2012 regarding China Patent Application No. CN200880020198.2.

(Continued)

*Primary Examiner* — Sujay Koneru
(74) *Attorney, Agent, or Firm* — Arent Fox LLP

(57) ABSTRACT

A method for managing tasks and user operations on media using a model of resources management dealing with the complexity of situation which occur in a production/distributions system is provided. The method is based on a workplace infrastructure, a task-oriented user interface and a work package management system. The method optimizes operations in media production/distribution environment through a workflow-based user interface that handles Work packages, Workplaces, Tasks, Assets and Contents.

23 Claims, 6 Drawing Sheets

(56) References Cited

U.S. PATENT DOCUMENTS

| | | |
|---|---|---|
| 6,574,655 B1 | 6/2003 | Libert et al. |
| 6,598,940 B2 | 7/2003 | Sinex |
| 6,606,546 B2 | 8/2003 | Sinex |
| 6,684,136 B2 | 1/2004 | Sinex |
| 6,760,916 B2 | 7/2004 | Holtz et al. |
| 6,792,469 B1 | 9/2004 | Callahan et al. |
| 7,062,449 B1 | 6/2006 | Clark |
| 7,069,229 B1 | 6/2006 | Richardson et al. |
| 7,080,142 B2 | 7/2006 | Galloway et al. |
| 7,103,677 B2 | 9/2006 | Miller et al. |
| 7,167,786 B2 | 1/2007 | Sinex |
| 8,121,874 B1 | 2/2012 | Guheen et al. |
| 8,126,938 B2 | 2/2012 | Cohen et al. |
| 8,214,516 B2 | 7/2012 | Gupta et al. |
| 8,296,801 B2 | 10/2012 | Takagi et al. |
| 2003/0046135 A1 | 3/2003 | Cartwright et al. |
| 2003/0204431 A1 | 10/2003 | Ingman |
| 2004/0059808 A1 | 3/2004 | Galloway et al. |
| 2004/0093351 A1 | 5/2004 | Lee et al. |
| 2005/0137927 A1 | 6/2005 | Jura |
| 2005/0193341 A1 | 9/2005 | Hayward et al. |
| 2005/0209902 A1 | 9/2005 | Iwasaki et al. |
| 2006/0047551 A1 | 3/2006 | Cotten et al. |
| 2006/0092266 A1 | 5/2006 | Morgan |
| 2006/0155630 A1 | 7/2006 | Sonnleithner et al. |
| 2006/0212805 A1 | 9/2006 | Allen et al. |
| 2006/0259472 A1 | 11/2006 | MacClellan |
| 2006/0277089 A1 | 12/2006 | Hubbard et al. |
| 2007/0016530 A1 | 1/2007 | Stasi et al. |
| 2007/0073575 A1 | 3/2007 | Yomogida |
| 2007/0113184 A1* | 5/2007 | Haot et al. .................... 715/723 |
| 2007/0124250 A1* | 5/2007 | Yamashima ........... H04N 5/913 705/51 |
| 2007/0157080 A1 | 7/2007 | Wadsworth et al. |
| 2007/0239787 A1* | 10/2007 | Cunningham ...... G06F 3/04817 |
| 2008/0101768 A1 | 5/2008 | Smith et al. |
| 2008/0235603 A1 | 9/2008 | Holm et al. |
| 2009/0201812 A1 | 8/2009 | Dettori et al. |

FOREIGN PATENT DOCUMENTS

| | | |
|---|---|---|
| JP | 2002259275 A | 9/2002 |
| JP | 2004501436 A | 1/2004 |
| JP | 200403138 A | 10/2004 |
| JP | 2005051491 A | 2/2005 |
| JP | 2005301841 A | 10/2005 |
| JP | 2005316871 A | 11/2005 |
| JP | 2006042317 A | 2/2006 |
| JP | 2008543124 A | 11/2008 |
| WO | 0041104 | 7/2000 |
| WO | 0141024 | 6/2001 |
| WO | 2004102343 A2 | 11/2004 |
| WO | 2006096713 A2 | 9/2006 |

OTHER PUBLICATIONS

Office Action issued for Japanese Patent Application No. 2010503010, mailed by SIPO on Feb. 26, 2013.

Office Action issued for Japanese Patent Application No. 2010503010, mailed by SIPO on Sep. 25, 2012.

International Preliminary Report on Patentability, PCT Application No. PCT/US2008/004230, mailed by WIPO, Switzerland, Apr. 1, 2008.

First Office Action regarding China Patent Application No. CN200880020198.2.

Decision for Rejection dated Jul. 2, 2013 regarding Japan Patent Application No. JP2010-503010.

Decision for Dismissal of Amendment dated Jul. 2, 2013 regarding Japan Patent Application No. JP2010-503010.

Canadian Office Action dated Jun. 30, 2015, regarding Canadian Application No. CA2682941.

Japanese Appeal Decision dated Jan. 20, 2015, regarding Japanese Application No. JP2010-503010.

Supplemental EP Search Report and Search Opinion dated Jan. 5, 2011, regarding EP Application No. EP08742449.5.

Concerning Business Methods, Notice from the European Patent Office, Official Journal of the European Patent Office, Nov. 1, 2007, pp. 592-593, XP007905525 ISSN: 01'70-9201.

International Search Report dated Dec. 23, 2008 regarding PCT/US2008/004230.

Office Action in corresponding Canadian Patent Application No. 2,682,941 dated Jun. 2, 2016.

Office Action mailed Oct. 21, 2016 issued in EP application 08742449.5.

* cited by examiner

OPERATIONAL MANAGEMENT SOLUTION FOR MEDIA PRODUCTION AND DISTRIBUTION

CROSS-REFERENCE TO RELATED APPLICATIONS

This application is a divisional application of U.S. application Ser. No. 12/450,565, filed on Sep. 30, 2009, which is a National Stage Entry of PCT/US2008/004230, filed on Apr. 1, 2008, which claims priority and the benefit of U.S. Provisional Application No. 60/923,027, filed on Apr. 12, 2007, wherein the foregoing patent applications are incorporated herein by reference in their entirety.

TECHNICAL FIELD

The present principles relate to a technique for distributing Content across a network. More particularly, they relate to providing a distributive and collaborative environment formedia production and distribution systems.

BACKGROUND ART

In the media industry, solutions for addressing specific Asset management needs are 20 now converging in an effort to provide a global solution for media Asset management with different levels of workflow management support. Examples of these solutions include:

1) Playout Automation

Present day playout automation techniques provide real time control of devices that playout video and audio Content according a schedule. Some playout techniques address the need to organize movement of Content at the receiving or ingest server and at the storage phases. The providers of playout devices have demonstrated an expertise in device interfaces, but are still evolving to support workflow engines. Currently, playout automation solutions propose static workflows that need significant rework at the configuration stage.

2) Document Asset Management:

Providers of document Asset management have served the print media and have demonstrated strength in managing documents. Many such providers have evolved into the multimedia environment to tackle the media industry. Typically, these providers lack expertise in real time device resource management and their automation solutions afford only limited ways to manage workflow.

3) Video Editing Systems

There exist several providers of video editing systems, at least one of which has introduced a non linear workflow solution for the media industry which only serves to manage workflow in a static way (i.e., not dynamic).

4) IT Middleware Suppliers:

Providers of IT Middleware typically offer specialized business layer applications and associated infrastructure to manage a transactional layer to handle workflows. In practice, such suppliers focus on business layers so their solutions do not provide a user interface and cannot control resources with load balancing or quality of services constraints.

SUMMARY

Briefly, in accordance with a preferred implementation of the present principles, there is provided a technique of managing tasks and user operations on media using a model of resource management capable of dealing with complex situations which often arise in a production and/or distribution environment. The technique is based on a workplace infrastructure, and includes a task-oriented user interface and a Work Package management system. The method optimizes operations in a media production/distribution environment through a workflow-based user interface handling: Work Packages, Workplaces, Tasks, Assets, and Content.

In accordance with one implementation, the method includes selecting a workplace category, selecting a workplace within the selected workplace category, providing at least one task corresponding to the selected workplace, updating a target Asset in response to a user selected task, and launching a command related to the selected task.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations or an apparatus storing instructions for performing a set of operations. Other aspects and features will become apparent from the following detailed description considered in conjunction with the accompanying drawings and the claims.

BRIEF DESCRIPTION OF THE DRAWINGS

In the drawings wherein like reference numerals denote similar elements throughout the views.

DETAILED DESCRIPTION

Figure 1A:
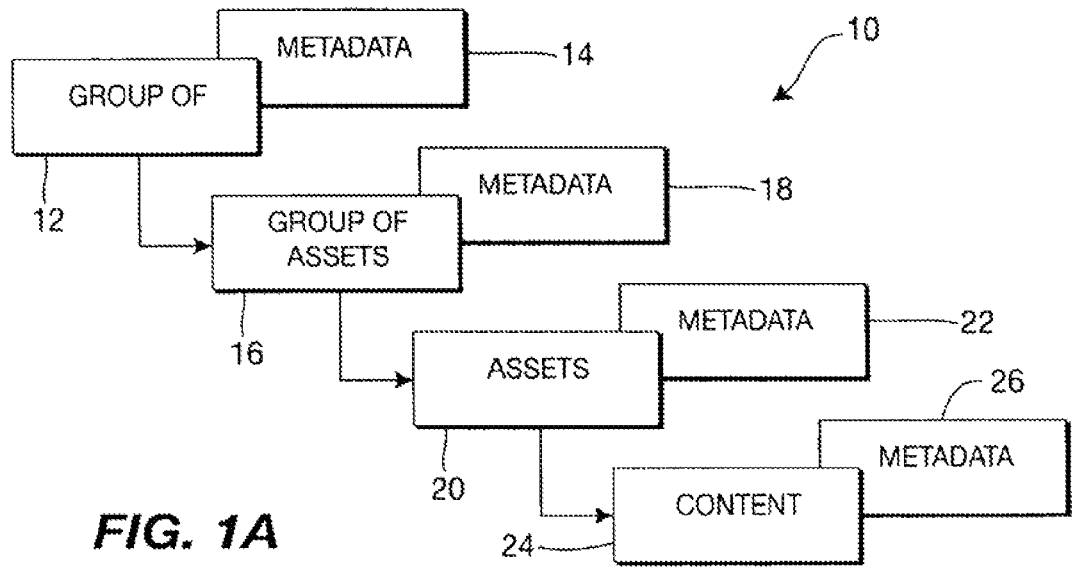
FIG. 1a depicts a block diagram of Assets and Content and corresponding metadata for the same according to an implementation of the present principles.

According to one aspect, a goal of the Content management technique of the present principles is to provide a distributive and collaborative environment for media production and/or distribution. Television broadcasting began some 60 years ago. The technologies associated with broadcasting and producing television shows have changed dramatically over the years, but certain fundamental processes have not evolved dramatically.

Despite the evolution of transferring Content, first via film, then by videotape, and finally now by transferring files of digitized video over a network, the overall workflows of these processes have did not significantly changed. The challenge in today's broadcasting environment is to provide an enterprise-level Media Asset Management solution with workflow management capability. This approach, which is based on a task-oriented user interface with a workplace/ work package concept, will dramatically improve broadcast operations and media production and post production.

The goal of the Asset management technique of the present principles is to manage and/or control distributed, parallel and collaborative production and/or distribution systems to ensure the availability of media for delivery. Such management techniques serve to solve a complex combination of constraints among: users; Content; processes; time; and networks that cannot not be resolved by an algorithmic system or an n-p complex task scheduling generator.

The Content management technique of the present principles serves to manage Content and Assets around a solution focused on operation workflow with:

A Dynamic user interface task base that enables each user to have the description of its respective task and the resource required to execute that task. The dynamic user task interface relies on a unique concept of dynamic Work Pages managed by a workflow engine;

A framework that helps define, manage and monitor operations to manage the infrastructure;

An advanced Media Asset management structure that gives a sufficient level of abstraction to manage and consolidate searches in a complex media creation environment;

A mechanism that allows interfacing with third party and/or legacy systems;

A Centralized monitoring solution to manage and consolidate alarms and logs of the technical and operational infrastructure; and Collaborative tool(s) that will leverage other elements such as, for example, a chat engine as a legacy solution like an Intercom in a broadcast environment with a voice over 1P intercom at the desktop.

Definition of Assets (Media)—As a very basic definition, an Asset comprises "something of worth". In the broadcast industry a definition has been established by the Society of Motion Picture and Television Engineers (SMPTE) standards body which defines an Asset as the aggregation of Content and Rights. Within this framework, the Content is defined as the aggregation of Essence and Metadata.

An Asset normally will be created in a business management system, e.g. a Traffic System, while creating a unique identification (ID), e.g., an Asset ID, which identifies the Asset. Because of the difficult abstraction of this definition, the term "Asset" is commonly used to name the dataset used to manage the Asset in a computer system. This dataset is uniquely identified using the Asset ID. Different systems exist in a broadcast facility at different levels. Of course, each of these systems could require its own structure and dataset to administer the Asset. Although many of Asset Administration datasets could exist in parallel, all would describe the same identical Asset.

EXAMPLES

Deleting an Asset administration dataset in a downstream system does not delete the Asset itself The act of deletion only deletes the Asset representation in this system. Moving an Essence that belongs to an Asset from one location to another location does not move the Asset either.

Figure 1B:
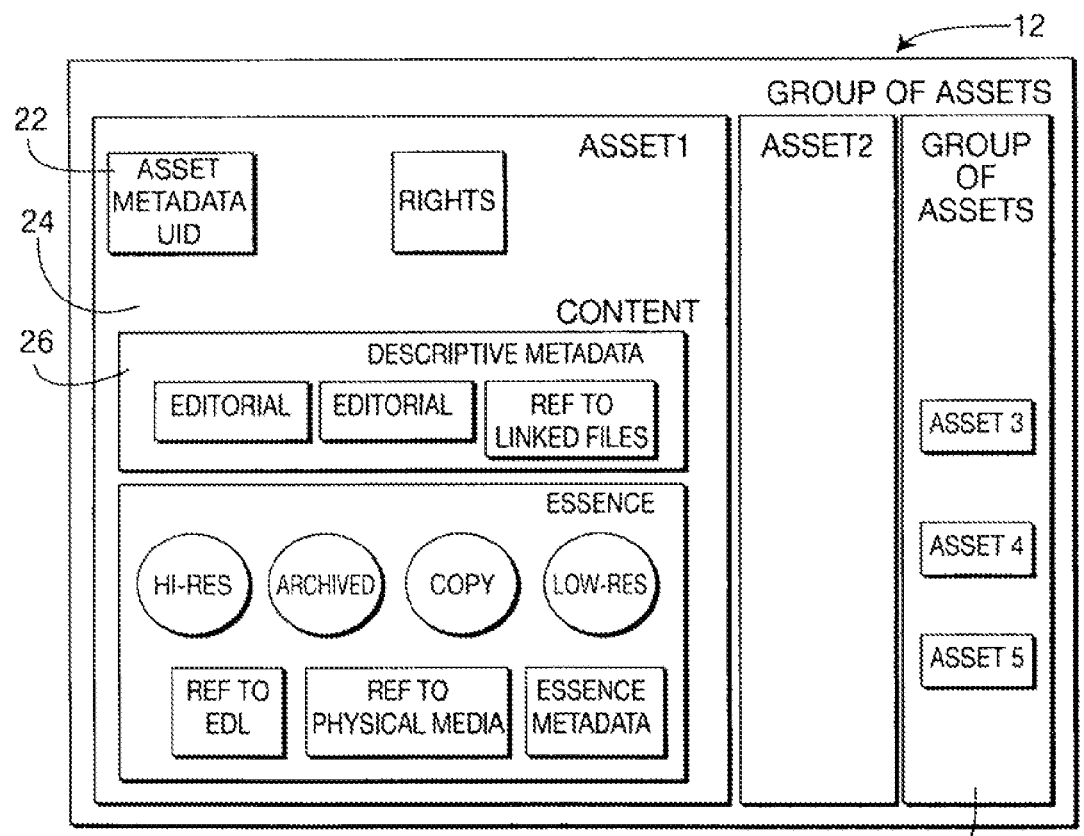
FIG. 1b depicts block diagram of the Assets, Content and corresponding metadata for the same according to an implementation of the present principles.

A media component can constitute an "Asset", and serves to regroup Essences named "Contents". The Media Management system can manage several levels of abstraction for individual pieces media which could be represented in the process with the model shown in FIG. 1*a* and 1*b* which illustrate a model 10 having many groups of Assets 12 each with its corresponding metadata 14. Each group of Assets 12 can include others groups of Assets 16 with their own corresponding metadata 18. Within each group of Assets 16, there exists or more Assets 20 with corresponding metadata 22. Each Asset has corresponding Content (Essence) 24 and metadata 26. This structure of the media management system provides a higher level of abstraction with the capability to handle a complex combination of Content and metadata as a single logical entity. Using such a representation enables basic computing and human operations as well as complex system processing and business operations to occur on the media entities.

Workplaces and Workplaces Categories

Figure 2:
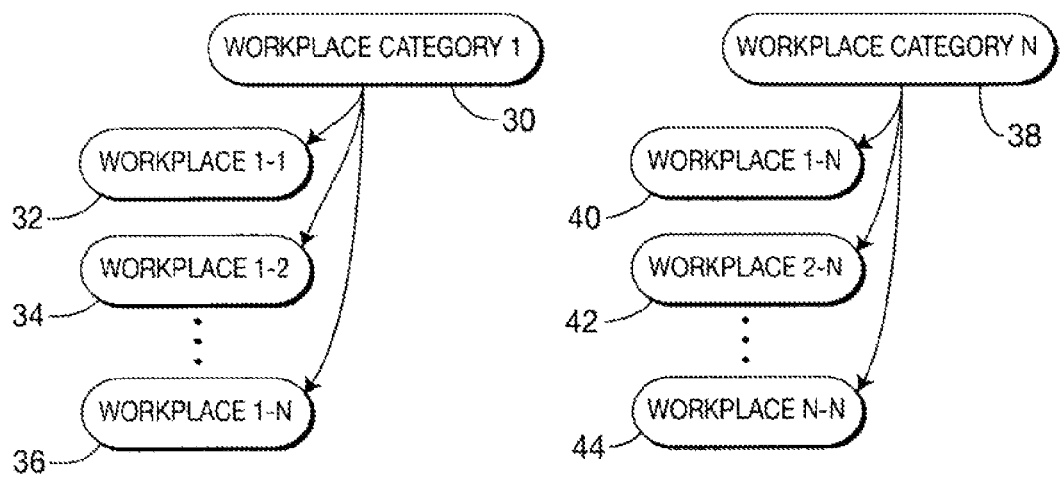
FIG. 2 depicts a block diagram of workplace and workplace categories according to an implementation of the present principles.

The term "Workplaces" defines specific positions in a logical workflow that are associated with one or more users' roles that contribute to the workflow by performing specific tasks. The workplace can refer to either a human operator or an automated actor. Workplaces are organized by categories. A workplace can be reached by many Work Packages (see definition below). FIG. 2 depicts an example of workplace categories and corresponding workplaces according to an implementation of the present principles. Workplace Category 1 (30) has N workplaces shown as Workplace 1-1 (32), Workplace 1-2 (34) and Workplace I-N (36), while Workplace Category N (38) includes Workplace I-N (40), Workplace 2-N (42) and Workplace N-N (44).

Figure 3:
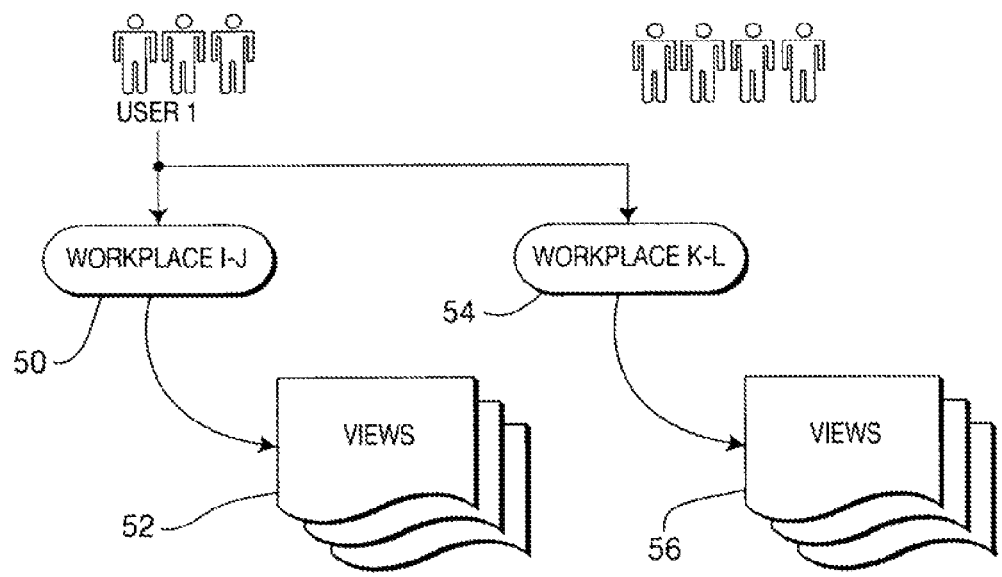
FIG. 3 depicts a block diagram of a workplace and corresponding viewpoints associated with a respective workplace, according to an implementation of the present principles.

As shown in FIG. 3, a Workplace offers users a specific viewpoint in the workflow. As shown, a user 1 can have access to Workplace I-J (50) and Workplace K-L (54), each having their respective views 52 and 54 of the workflow.

A Workplace can also refer to a non human actor (e.g., a machine) that can automatically execute one or more pre defined task(s). The Workplace categories do not require either a specific order or sequences to link them together. Workplaces in Workplace categories do not require any relationship together. The model of FIG. 3 provides a level of abstraction to regroup viewpoints in a workflow. The final operational viewpoint are the Workplaces (See for Example, FIG. 2), where tasks will be exposed to the users with their respective views. As mentioned above, this Workplace representation provides the logical infrastructure of the workflow.

The Content management technique of the present principles provides means to describe, for a workplace, a set of views that provide information on the media and the tool(s) that operate on such media. According to their respective role in the system, the users have access to a set of workplaces and each workplace can expose the users a different a set of views. Those operational views will combine different user tools and commands that can vary according to the rank of operator (user or super-user) which will affect the media.

User & Task Oriented Mechanism

Figure 4:
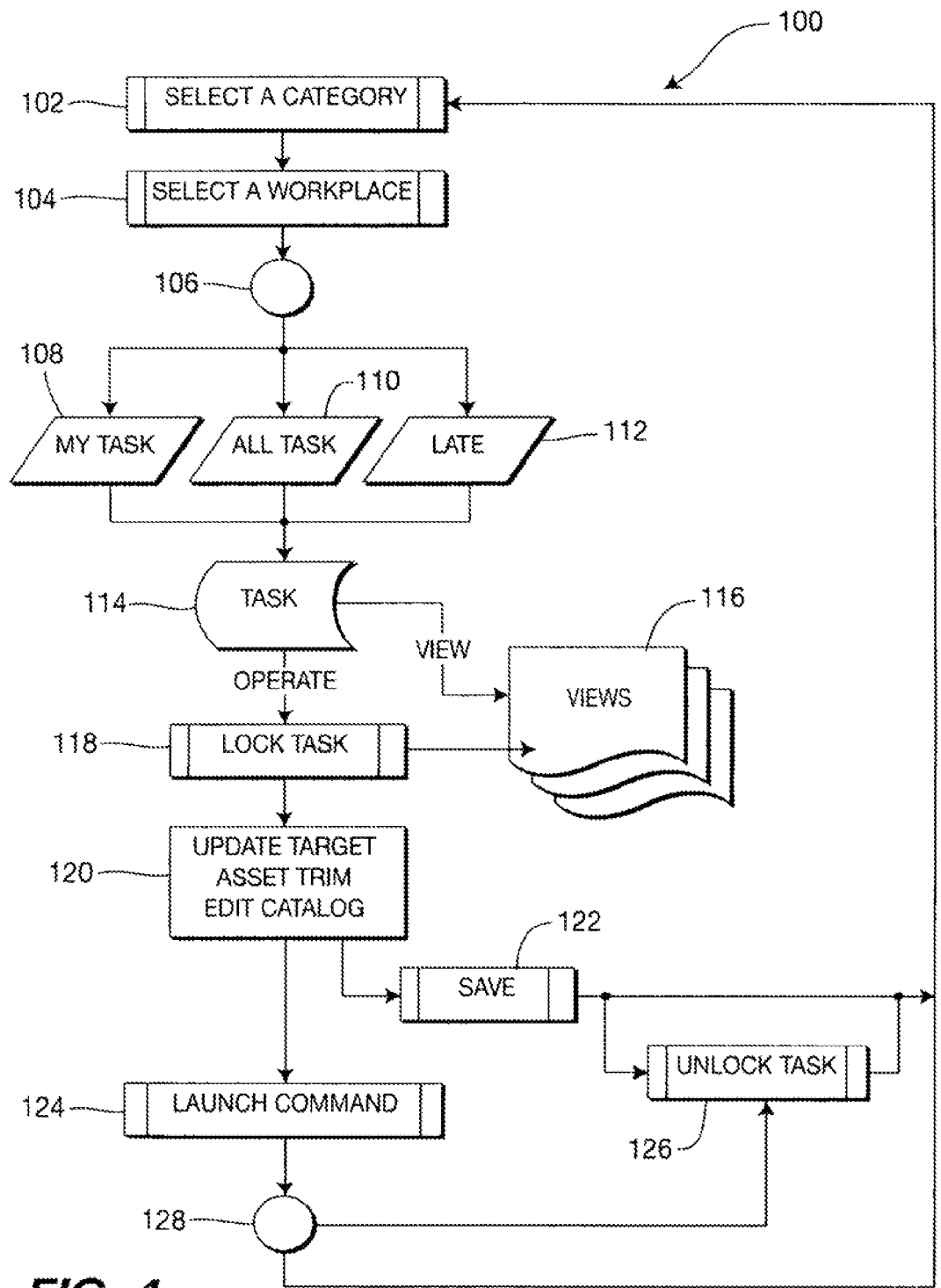
FIG. 4 depicts a flow chart diagram of a process of the user and task oriented steps according to an implementation of the present principles.

FIG. 4 illustrates a method 100 for user operation of a task oriented system. Upon logging into the system, the user can access workplaces by initially selecting a category (step 102). The user then selects then a workplace (step 104) from the selected category through the categorization of task element 106. According, the system automatically provides:

1—The tasks assigned to the a specific operator/user, labelled as My Task (step 108);

2—All the tasks located at the workplace, labelled as All Task (step 110); and

3—The tasks which are late, thus requiring assignment as urgent, being labelled in FIG. 4 as Late (step 112).

From such information provided by the system, each connected user knows what is occurring in real-time at the workplace and also what task remain, as well as what tasks other users are performing.

The user then has its task 114 and corresponding views 116. The user then operates and locks its task (step 118). To perform a task, the user should lock it in order to avoid two operators from inadvertently attempting to perform the same task. The locking action also serves to track the progress of the task. In addition, the locking of a task enables recording of the time the operator took to perform their task by monitoring the time between the lock and the submission relating to task completion. Once locked, the target Asset is updated (step 120), and the steps of trimming, editing and cataloging are performed. At this stage, the command relating to this task can be launched (step 124), or the command can be saved (step 122) for later execution. When the command has been launched, the element 128 forwards a command to unlock the task (step 126) which makes the task now available to for future action.

Context of an Application

Figure 5:
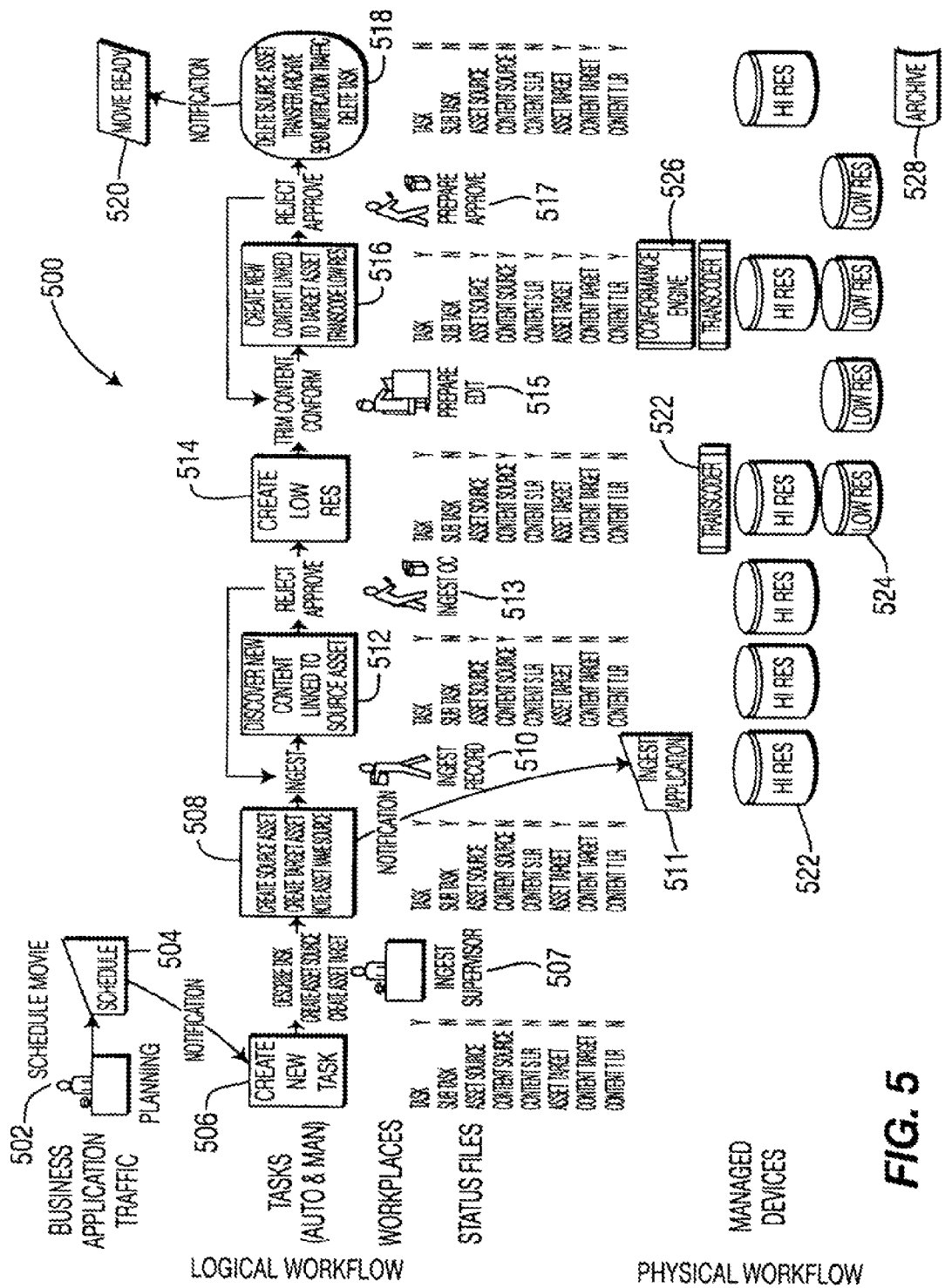
FIG. 5 depicts an operational workflow diagram of the ingest aspect of the system of the present principles.

FIG. 5 depicts a typical workflow example which validates applicability of the concepts described above. (Note: those of ordinary skill in the art will recognize that a number of short cuts have been taken to simplify the discussion.) In reality, the system can possess much greater complexity and in some instances, such complexity might require the creation of low resolution Content for use in the system.

Operational Sub Workflow 1 Ingest

Referring to FIG. 5, assume that a business department 502 intends to broadcast a movie (e.g., the Matrix). The business department 502 creates a placeholder Asset "Matrix" in the traffic database with "to Ingest" (e.g., to receive Content) as the status along with a target duration.

The system receives from the traffic a notification 504 to create a work package (i.e., task 506) named "Matrix to ingest" with an expected duration. The work package moves forward to the next workplace 507.

The operation department (workplace 507) adds description and creates the source Asset (e.g., "Matrix original") and the target Asset (Matrix master) 508.

The system sends a notification (step 509) to the ingest application 511 to record the "Matrix original" Content. The work package moves forward to the next workplace 510. The ingest application 511 causes the recording of the Content in high resolution (step 522).

The ingest operator (workplace 510) ingests the Content "Matrix original." When ingest occurs, the system links the source Asset with the source Content "Matrix 25 original" (step 512). The work package moves forward to the next workplace 513.

The Quality Control (QC) operator (workplace 513) validates the Content. (If the Content cannot be validated, the Content returns to the workplace associated with Content ingest). The system creates a low-resolution copy 524 (Matrix Source) of the source Content using a trans coder 522 (step 514) and links it to the source Asset. The work package moves forward to the next workplace 515.

The trim operator (workplace) 515, using the low-resolution source Content 524, adjusts the Content to fit the target duration and creates a new Content 516 associated with the target Asset via a conform command provided by a conformance engine 526. The Content matches the Asset name (Matrix master). The system creates a low resolution version of "Matrix Master", which is a low resolution version of the new version of the Content after modification (i.e., trimming). The work package moves forward to the next workplace 517.

At workplace 517, the Asset undergoes review for approval as low resolution Content. If the Asset is rejected, the Asset returns to the trim operator 515.

The system then performs the following activities: (a) deleting the source Asset with Low and high-resolution Content, archives the target Content at workplace 528, (b) deleting the low resolution target, (c) moving the Asset to the archive workplace, and (d) deleting the work package after sending a notification (step 519) to the traffic that the "Matrix Master" is ready for playout (step 520).

Operational Workflow 2 Playout

Figure 6:
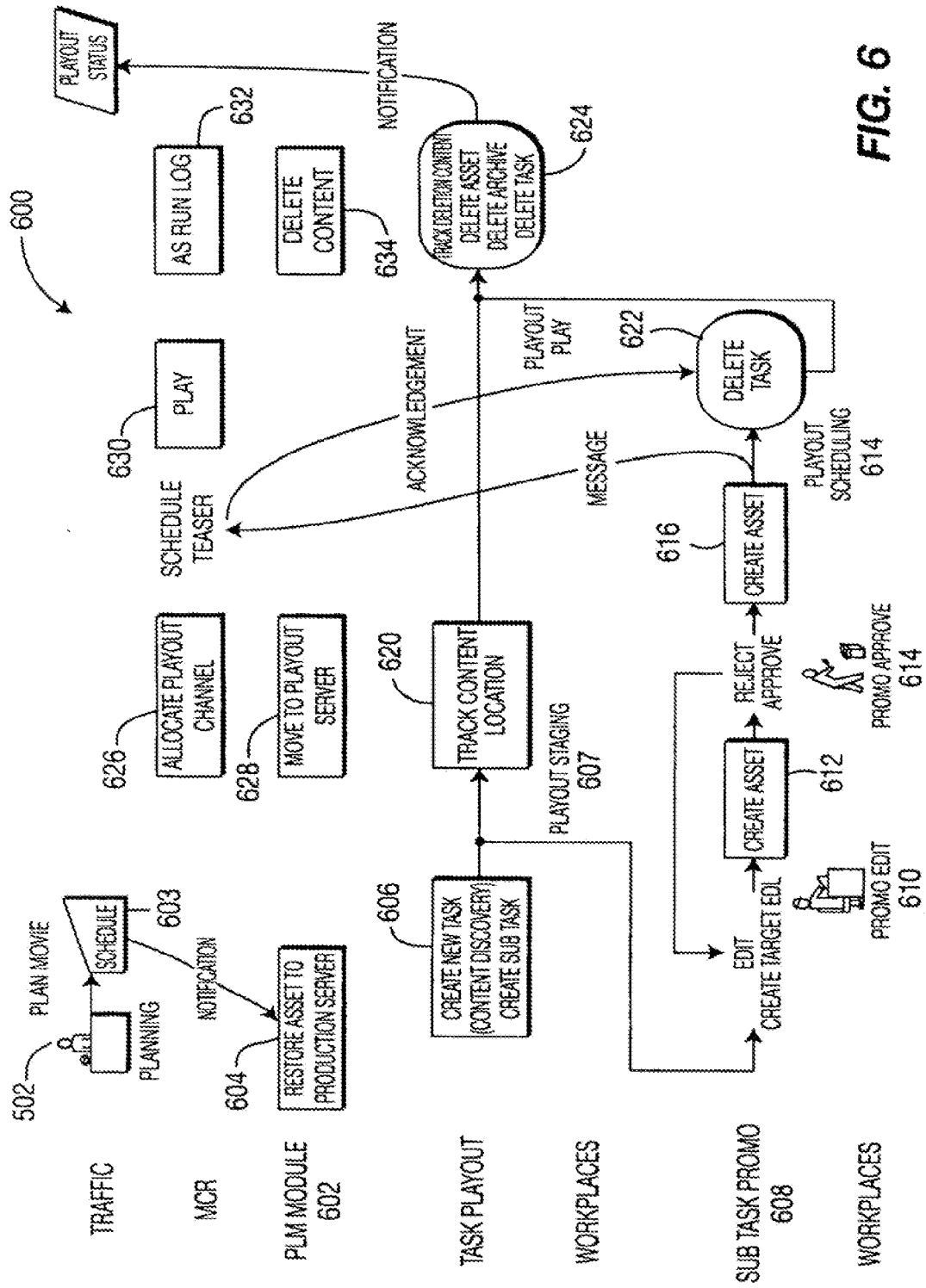
FIG. 6 is an operational workflow diagram of the playout aspect of the system of the present principles.

In the example depicted in FIG. 6, assume the traffic operation 502 plans playout of the movie "Matrix" next Monday. To that end, the system PLM module 602 tracks the scheduling of the movie "Matrix" and automatically sends a command 603 to a Media frame transfer manager to restore the Content "Matrix master" to the staging server (step 604)

The system detects the Content in the staging server and creates a new work package 606 (i.e., task) "Matrix play" that will support parallel task with also the creation of a teaser. The system then performs the following activities: (a) moving the created Work Package 606 to "playout staging" workplace 607, and (b) creating a secondary work package or task (step 608) "Matrix promo" with an expected completion in 2 days (usually look ahead for scheduling) and moves it to the next workplace 607 (playout staging).

The promo editor 610 creates a teaser and creates an Edit Decision List (EDL) named "Matrix promo." The system creates a new Asset "matrix teaser" (step 612) and moves the work package to the next workplace 614 (promo approve).

When the teaser is approved, the system conforms the new Content according to the EDL (step 616), and sends a notification 617 to the MCR supervisor to inform that teaser 30 (e.g., the Matrix) is available. When the operator MCR supervisor acknowledges the message (step 619), the Asset is moved to the staging area, the secondary sub workflow 608 is completed by deleting the task 622, and the main task Playout workflow continues. After the automation assigns or allocates the movie and the teaser to a channel (step 626), the PLM module 602 moves the Content to the dedicated playout server (step 62S). The work packages are moved to playout. An alarm will be sent if the work packages are not available. That is, an alarm will be sent if the file has been deleted or something went wrong during the process 5 (e.g., the work package was rejected due to quality issues). The automation station plays the Content (step 630), and the PLM module catches the "As Run Log" report from the automation (step 632) and deletes the Contents (step 634). The system tracks the deletion of Contents (step 624) and deletes the Assets, the archive and the task after sending a notification to traffic to playout the movie.

Figure 7A:
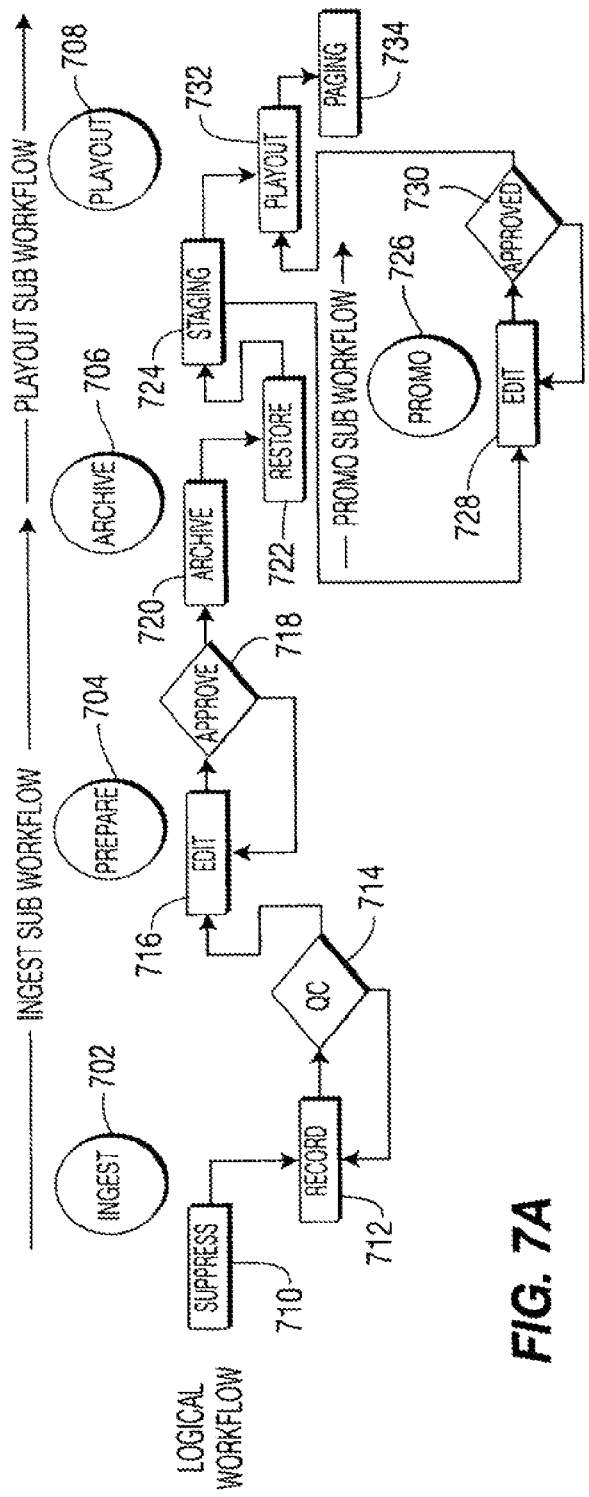
FIG. 7a depicts the logical workflow of the workplace infrastructure according to an implementation of the present principles.
Figure 7B:
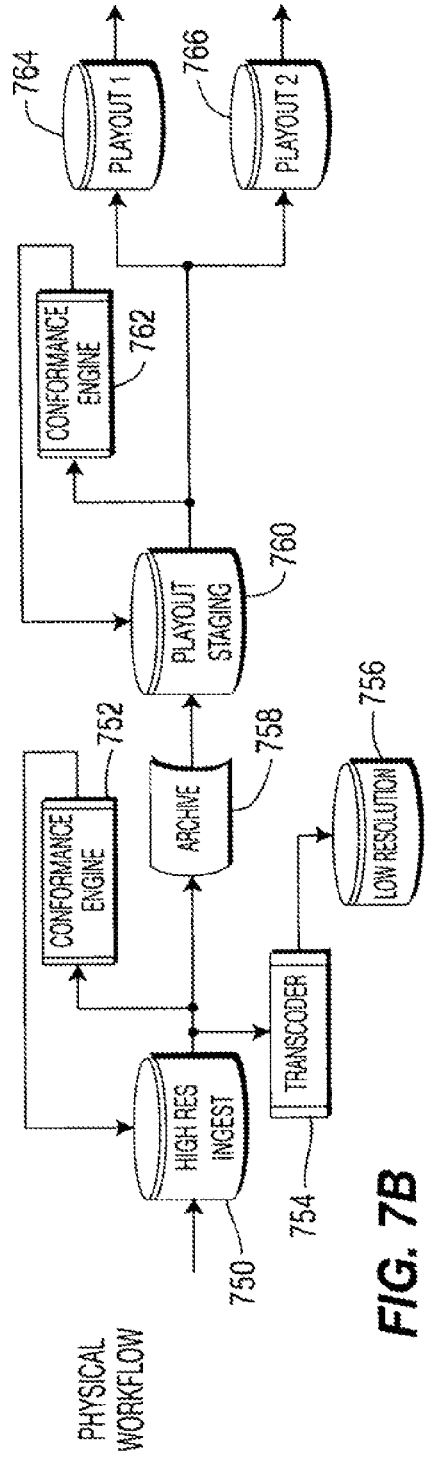
FIG. 7b depicts the physical workflow of the workplace infrastructure according to an implementation of the present principles.

FIGS. 7a and 7b show the logical workflow and physical workflow, respectively of the operational management system of the present principles. The logical workflow depicted in FIG. 7a illustrates the Ingest sub-workflow which comprises the steps of Ingest (step 702), Prepare (step 704) and Archive (step 706). The Ingest step 702 generally includes a supervisor 710 to record (step 712) and manage the quality control (step 714) of the requested task (e.g., as explained with reference to FIGS. 5 and 6, in the present example, the task is the playout of a movie. (Those of skill in the art will recognize that the tasks can change without departing from the scope of the present principles). During the Prepare step 704, the task is edited (step 716) and approved (step 718). Once approved, the task is archived (step 720) and then restored (step 722 for the playout (step 708). The Playout step 708 includes the staging (step 724) and possibly a promo sub workflow (step 726). If there no promo step 726 occurs, the task is played out (step 732), and the system is then purged from this task (step 743).

FIG. 7*b* depicts the physical workflow corresponding to the logical workflow. As shown in FIG. 7*b*, during ingest (step 702), a high resolution version 750 of the requested Content created and run through a conformance engine 752 to confirm that the Content conforms to a desired format. The Content is also run through a transcoder 754 to create a low resolution version of the high resolution format (step 756). Once created, the high resolution version is archived (step 758) and is then sent to the playout staging (step 760). At this point, the playout staging passes the Content to the conformance engine 762 which creates a high-resolution clip according to the editing performed during step 16, and then passes the Content to one or more distribution channels for playout (e.g., playout 1 (step 764) and playout 2 (step 766).

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream, packetizing the encoded stream, and modulating a carrier with the packetized stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are within the scope of the following claims.

What is claimed:

1. A computer-implemented method for managing media production and distribution, the method comprising:
   creating a source media asset, by at least one processor, upon notification of a work package and sending a notification to an ingest workplace, wherein a media asset comprises an aggregation of media content and rights, and wherein the content comprises an essence and metadata;
   ingesting a recording of the content of the source media asset at the ingest workplace and linking, by the at least one processor, the recorded content to the source media asset and forwarding the work package to an editing workplace, wherein the linking comprises storing a reference to a link between the source media asset and the recorded content;
   by the at least one processor, creating an adjusted low-resolution copy of the source media content at the editing workplace and linking the adjusted low-resolution copy to the source media asset by storing a reference to a link between the source media asset and the adjusted low-resolution copy wherein said creating comprises editing the source media content;
   creating a new high resolution media content which conforms to the adjusted low resolution copy of the source media content;
   archiving the new high resolution media content; and
   playing out the new high resolution media content, wherein the playing out of the new high resolution media content comprises:
      sending the archived version of the new high resolution media content to a staging facility;
      running the new high resolution media content through a conformance engine to confirm proper format and creating a final high resolution clip according to the editing; and
      sending the final high resolution clip to at least one distribution channel for playout.

2. The method of claim 1, further comprising:
   conducting quality control on the recorded content.

3. The method of claim 1, further comprising:
   moving the source media asset to an archive workplace.

4. The method of claim 3, further comprising:
   sending a notification that the media content is ready for playout.

5. The method of claim 4, further comprising:
   deleting a work package association with the source media asset after sending the notification.

6. The method of claim 1, wherein said creating comprises trimming the low-resolution copy of the source media content to fit a target duration, and wherein the new high resolution media content conforms to the adjusted low resolution copy of the source media content by fitting the target duration.

7. The method of claim 1, further comprising:
creating a low resolution version of the media content from the new high resolution version of the media content.

8. A computer-implemented method for managing media production and distribution, the method comprising:
creating a source media asset, by at least one processor, upon notification of a work package and sending a notification to an ingest workplace, wherein a media asset comprises an aggregation of media content and rights, and wherein the content comprises an essence and metadata;
ingesting a recording of the content of the source media asset at the ingest workplace and linking, by the at least one processor, the recorded content to the source media asset and forwarding the work package to an editing workplace, wherein the linking comprises storing a reference to a link between the source media asset and the recorded content;
by the at least one processor, creating an adjusted low-resolution copy of the source media content at the editing workplace and linking the adjusted low-resolution copy to the source media asset by storing a reference to a link between the source media asset and the adjusted low-resolution copy wherein said creating comprises editing the source media content;
creating a new high resolution media content which conforms to the adjusted low resolution copy of the source media content;
archiving the new high resolution media content;
sending the archived high resolution version of the media content to a staging facility;
creating a promotional clip of high resolution version sent to the staging facility, wherein the creating includes editing and approving the promotional clip; and
forwarding the high resolution media content and the promotional clip to one or more distribution channels for playout.

9. The method of claim 8, further comprising:
running the new high resolution media content through a conformance engine; and
creating a low resolution version of the media content from the new high resolution version of the media content.

10. The method of claim 8, further comprising:
conducting quality control on the recorded content.

11. A system for managing media production and distribution, the system comprising:
means for creating a source media asset upon notification of a work package and sending a notification to an ingest workplace, wherein a media asset comprises an aggregation of media content and rights, and wherein the content comprises an essence and metadata;
means for ingesting a recording of the content of the source media asset at the ingest workplace and linking the recorded content to the source media asset and forwarding the work package to an editing workplace, wherein the linking comprises storing a reference to a link between the source media asset and the recorded content;
means for creating, by at least one processor, an adjusted low-resolution copy of the source media content at the editing workplace and linking the adjusted low-resolution copy to the source media asset by storing a reference to a link between the source media asset and the adjusted low-resolution copy wherein said creating comprises editing the source media content;

means for creating a new high resolution media content which conforms to the adjusted low resolution copy of the source media content;
means for archiving the new high resolution media content; and
means for playing out the new high resolution media content, wherein playing out of the new high resolution media content comprises:
sending the archived version of the new high resolution media content to a staging facility;
running the new high resolution media content through a conformance engine to confirm proper format and creating a final high resolution clip according to the editing; and
sending the final high resolution clip to at least one distribution channel for playout.

12. The system of claim 11, further comprising:
means for conducting quality control on the recorded content.

13. The system of claim 11, wherein said means for creating trims the low-resolution copy of the source media content to fit a target duration, and wherein the new high resolution media content conforms to the adjusted low resolution copy of the source media content by fitting the target duration.

14. The system of claim 11, wherein the system is configured to create a low resolution version of the media content from the high resolution version of the media.

15. The system of claim 11, wherein the system is configured to move the source media asset to an archive workplace.

16. The system of claim 15, wherein the system is configured to send a notification that the media content is ready for playout.

17. The system of claim 16, wherein the system is configured to delete a work package association with the source media asset after the notification is sent.

18. A system for managing media production and distribution, the system comprising:
means for creating a source media asset upon notification of a work package and sending a notification to an ingest workplace, wherein a media asset comprises an aggregation of media content and rights, and wherein the content comprises an essence and metadata;
means for ingesting a recording of the content of the source media asset at the ingest workplace and linking the recorded content to the source media asset and forwarding the work package to an editing workplace, wherein the linking comprises storing a reference to a link between the source media asset and the recorded content;
means for creating, by at least one processor, an adjusted low-resolution copy of the source media content at the editing workplace and linking the adjusted low-resolution copy to the source media asset by storing a reference to a link between the source media asset and the adjusted low-resolution copy, wherein said creating comprises editing the source media content;
means for creating a new high resolution media content which conforms to the adjusted low resolution copy of the source media content;
means for archiving the new high resolution media content;
means for sending the archived high resolution version of the media to a staging facility;

means for creating a promotional clip of high resolution version sent to the staging facility, wherein the creating includes editing and approving the promotional clip; and means for sending the new high resolution media content and the promotional clip to at least one distribution channel for playout.

19. The system of claim 18, further comprising:

means for running the high resolution media content through a conformance engine; and means for creating a low resolution version of the media content from the high resolution version of the media.

20. The system of claim 18, wherein the system is configured to conduct quality control on the recorded content.

21. The system of claim 18, wherein the system is configured to move the source media asset to an archive workplace.

22. The system of claim 21, wherein the system is configured to send a notification that the media content is ready for playout.

23. The system of claim 22, wherein the system is configured to delete a work package association with the source media asset after the notification is sent.

* * * * *